(12) United States Patent
Karube (10) Patent No.: US 7,095,962 B2
(45) Date of Patent: Aug. 22, 2006

(54) OPTICAL TRANSMISSION SYSTEM

(75) Inventor: Hiro Karube, Tokyo (JP)

(73) Assignee: Denso Corporation, Kariya (JP)

(*) Notice: Subject to any disclaimer, the term of this patent is extended or adjusted under 35 U.S.C. 154(b) by 724 days.

(21) Appl. No.: 10/228,057

(22) Filed: Aug. 27, 2002

(65) Prior Publication Data

US 2003/0048515 A1 Mar. 13, 2003

(30) Foreign Application Priority Data

Aug. 28, 2001 (JP) ............................. 2001-258703

(51) Int. Cl.
*H04B 10/08* (2006.01)
*H04B 10/00* (2006.01)

(52) U.S. Cl. ...................... 398/169; 398/19; 398/47; 398/170; 385/16; 385/19

(58) Field of Classification Search ............ 398/16–19, 398/45–56, 7.6, 169–170; 385/16–19
See application file for complete search history.

(56) References Cited

U.S. PATENT DOCUMENTS

| 6,253,001 | B1* | 6/2001 | Hoen ............................. 385/17 |
| 6,363,182 | B1* | 3/2002 | Mills et al. .................... 385/17 |
| 6,445,841 | B1* | 9/2002 | Gloeckner et al. ............ 385/17 |
| 6,493,139 | B1* | 12/2002 | Liu et al. ..................... 359/484 |

FOREIGN PATENT DOCUMENTS

| EP | 1 126 302 A2 | 8/2001 |
| EP | 1126302 A2 * | 8/2001 |
| JP | 06-075176 | 3/1994 |
| JP | 11-002769 | 1/1999 |
| JP | 11-090665 | 4/1999 |
| JP | 11-095154 | 4/1999 |
| JP | 2000-010029 | 1/2000 |
| JP | 3040812 | 3/2000 |
| JP | 2001-174724 | 6/2001 |

OTHER PUBLICATIONS

Chinese Office Action dated Jul. 16, 2004 with English Translation.

* cited by examiner

Primary Examiner—Dzung Tran
(74) Attorney, Agent, or Firm—Posz Law Group, PLC

(57) ABSTRACT

An optical transmission system of the present invention includes input ports to which laser beams are respectively input, condensing, input optical elements, input reflectors corresponding one-to-one to the input optical elements each, output reflectors, output optical elements, and output ports. Assume that maximum one and minimum one of optical distances between the input optical elements and the output optical elements are DL and DS, respectively. Then, the beam waist position Q of the laser beam output from the input optical element closest to the input port satisfies a relation:

$$0.9(DL+DS)/4 \leq Q \leq 1.1(DL+DS)/4.$$

12 Claims, 6 Drawing Sheets

OPTICAL TRANSMISSION SYSTEM

BACKGROUND OF THE INVENTION

1. Field of the Invention

The present invention relates to an optical transmission system that causes a light beam to propagate through a space and more particularly to an optical transmission system of the type needing high signal quality.

2. Description of the Background Art

Japanese Patent Laid-Open Publication No. 6-75176 discloses a microdynamic optical switch including an input port implemented by a single optical fiber, a mirror for steering a light beam, a piezoelectric actuator for moving the mirror, and an output port implemented by n optical fibers. The input port and output port are inclined by 90° relative to each other. A light beam output from the input port is incident to the output port via the mirror, which is inclined by 45° relative to an optical path assigned to the light beam. The distance between the input port and the output port is greater than 50 μm if optics includes a collimator lens or 50 μm or below if otherwise. The distance of 50 μm or below is, according to the above document, necessary for achieving a small insertion loss. Also, the document describes that the collimator lens collimates the light beam to thereby reduce the divergence of the light beam, realizing a small insertion loss even if the distance is greater than 50 μm.

However, the piezoelectric actuator taught in the above document and having a micromechanical structure cannot drive the mirror by more than a certain distance, limiting the number of input ports and output ports available. Further, the distance between the input port and the mirror and therefore the beam radius differs in dependence on the output port. This means that signal quality is dependent on the output port.

Japanese Patent Laid-Open Publication No. 2000-10029 proposes an optical switch including an input port and an output port implemented by optical fibers, a plurality of lenses, a plurality of movable mirrors, and a fixed mirror. This document describes that the movable mirrors so operate as to minimize an optical loss. Such an optical switch, however, needs the movable mirrors and requires them to move over a broad range while increasing a distance between the input port and the output port. The increase in the distance between the input port and the output port causes the distance between the input port and the mirrors to vary independence on the output port, also causing signal quality to vary in dependence on the output port.

Technologies relating to the present invention are also disclosed in, e.g., Japanese Patent Laid-Open Publication Nos. 11-2769, 11-90665, 11-95154 and 2001-174724 and Japanese Patent No. 3,040,812.

SUMMARY OF THE INVENTION

It is an object of the present invention to provide an optical transmission system insuring uniform signal quality without regard to the output port.

It is another object of the present invention to provide an optical transmission system insuring a uniform beam radius without regard to an output port.

It is still another object of the present invention to provide an optical transmission system capable of noticeably reducing an optical loss despite that a distance between an input port and an output port varies at the time of optical switching.

It is yet another object of the present invention to provide an optical transmission system capable of reducing limitations on a distance between an input port and an output port.

It is further object of the present invention to provide an optical transmission system capable of reducing limitations on the physical arrangement of an input port and output port.

An optical transmission system of the present invention includes a plurality of input ports to which a plurality of laser beams are respectively input. A plurality of input optical elements corresponding one-to-one to the input ports each condense a particular laser beam. A plurality of input reflectors corresponding one-to-one to the input optical elements each reflects a particular laser beam condensed. A plurality of output reflectors each further reflect the particular laser beam. A plurality of output optical elements corresponding one-to-one to the output reflectors each further condense the respective laser beam reflected. A plurality of output ports corresponding one-to-one to the output optical elements each receive the respective laser beam condensed. Assume that the maximum optical distance and the minimum optical distance between the input optical element closest to the input port and the output optical element closest to the output port are DL and DS, respectively. Then, the beam radius of the laser beam at the output end of the input port, the wavelength of the laser beam, the distance between the output end and the input optical element and the focal distance of the input optical element are selected such that the beam waist position Q of the laser beam output from the input optical element closest to the input port satisfies a relation:

$$0.9(DL+DS)/4 \leq Q \leq 1.1(DL+DS)/4$$

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

First, there will be described a method of determining the size of a reflector included in an optical transmission system embodying the present invention and a beam waist position.

Figure 1:
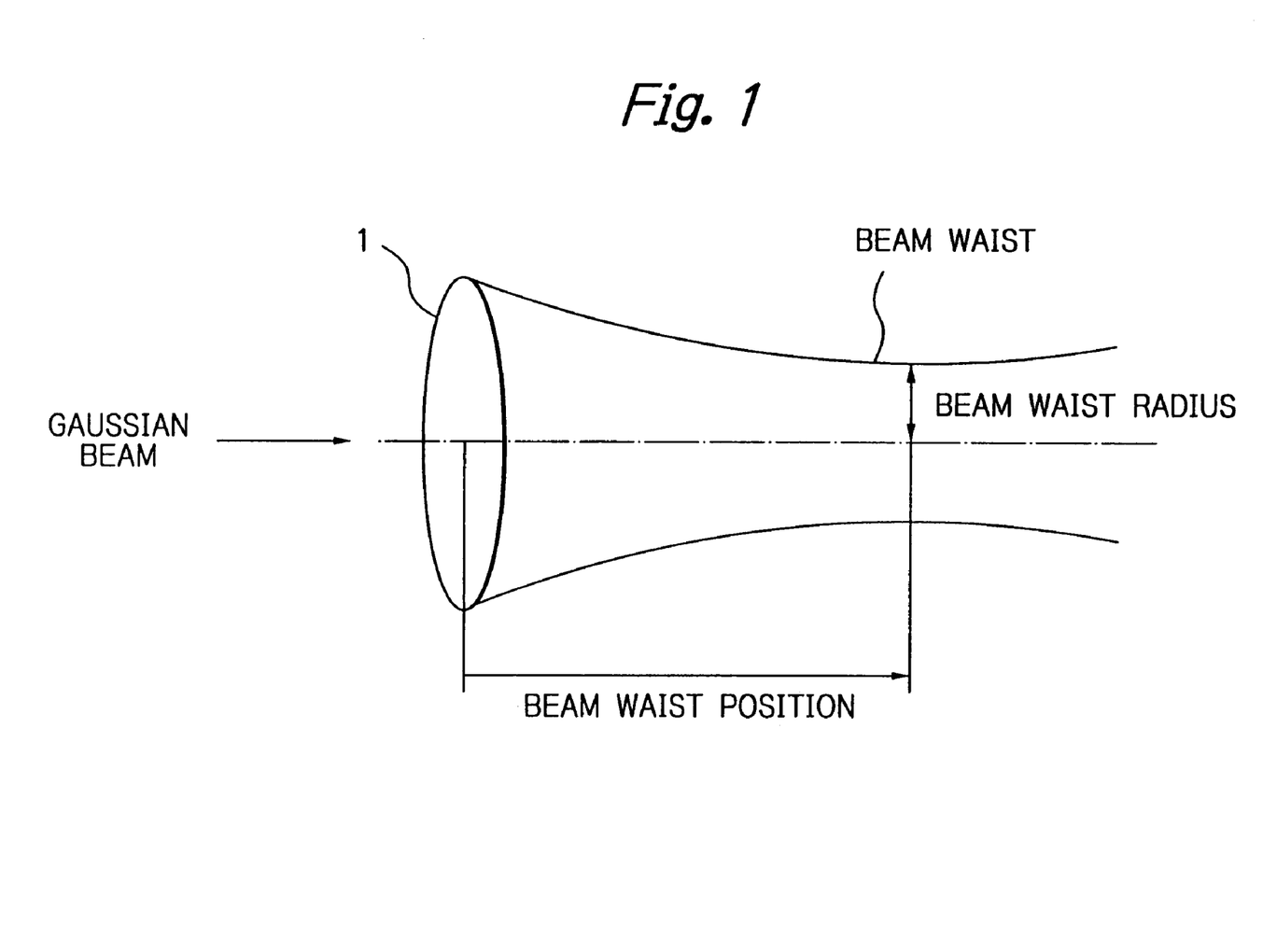
FIG. 1 is a view for describing the characteristics of a Gaussian beam.

A laser beam can be dealt with as a Gaussian beam and has the following characteristics. As shown in FIG. 1, when a Gaussian beam is condensed by an optical element, typically a lens, 1, its radius becomes minimum at a position spaced from the optical element 1 by a preselected distance. Such a position is generally referred to as a beam waist position. Also, a beam radius, as measured at the beam waist position, where power is $1/e^2$ of power at the center of the beam is referred to as a beam waist radius. A beam radius W(x) at a position spaced from the beam waste position either forward or backward is expressed as:

$$W(x) = W_0 \sqrt{1 + \left(\frac{\lambda \cdot x}{\pi \cdot W_0^2}\right)^2} \quad \text{Eq. (1)}$$

where Wo is the beam waist radius at the beam waist position, λ is the wavelength of the beam, x is a distance from the beam waist position, and n is the ratio of the circumference of a circle to its diameter.

Figure 2:
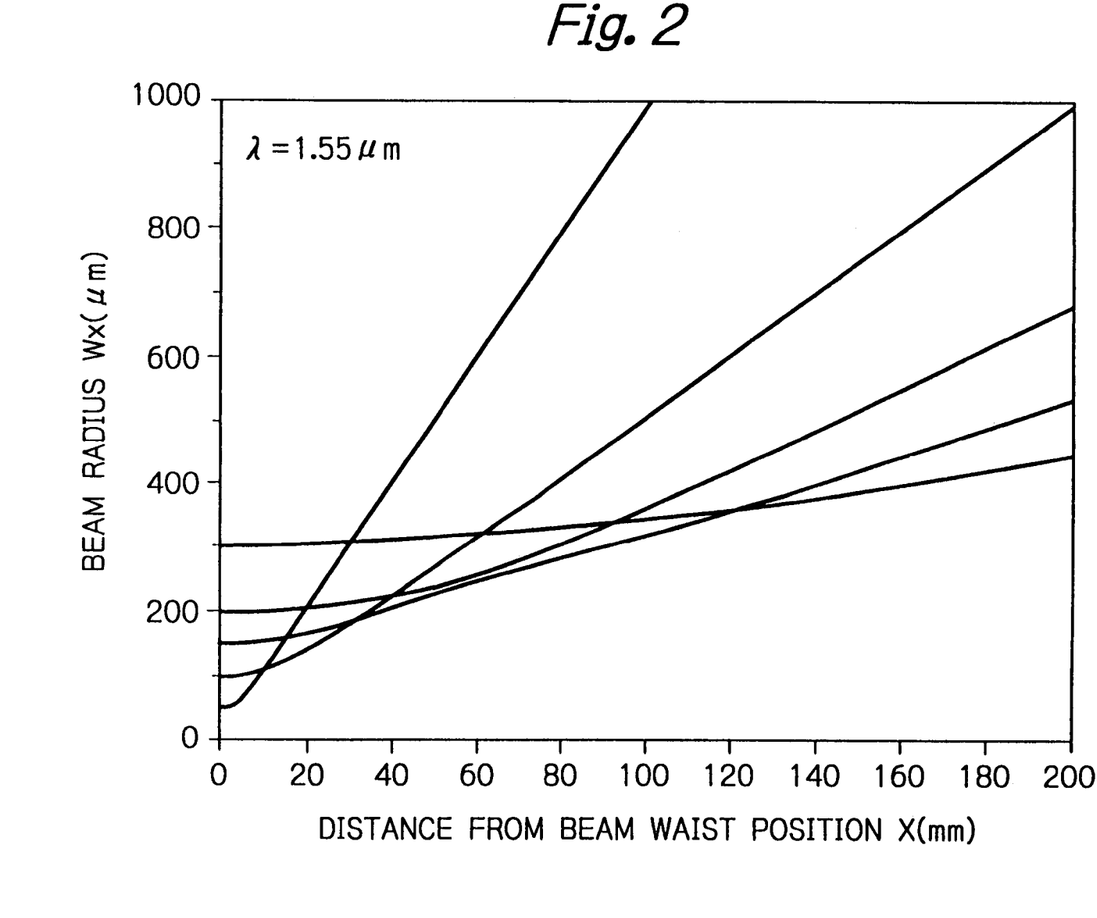
FIG. 2 is a graph showing a relation between a distance from a beam waist position and a beam radius.

FIG. 2 shows a relation between the distance from the beam waist position and the beam radius. In FIG. 2, the ordinate indicates the beam radius W(x) (μm) while the abscissa indicates the distance x (nm) from the beam waist position; the position on the abscissa where the distance x is zero is the beam waist position. Curves shown in FIG. 2 were derived from a wavelength λ of 1.55 μm and various beam waist radiuses by using the Eq. (1). As FIG. 2 indicates, the beam broadens as the distance from the beam waist position increases. Also, the beam broadens by a greater ratio as the beam waist radius decreases. Further, when the distance from the beam waist position is determined, the lower limit of the beam radius at such a distance is theoretically determined.

Figure 3:
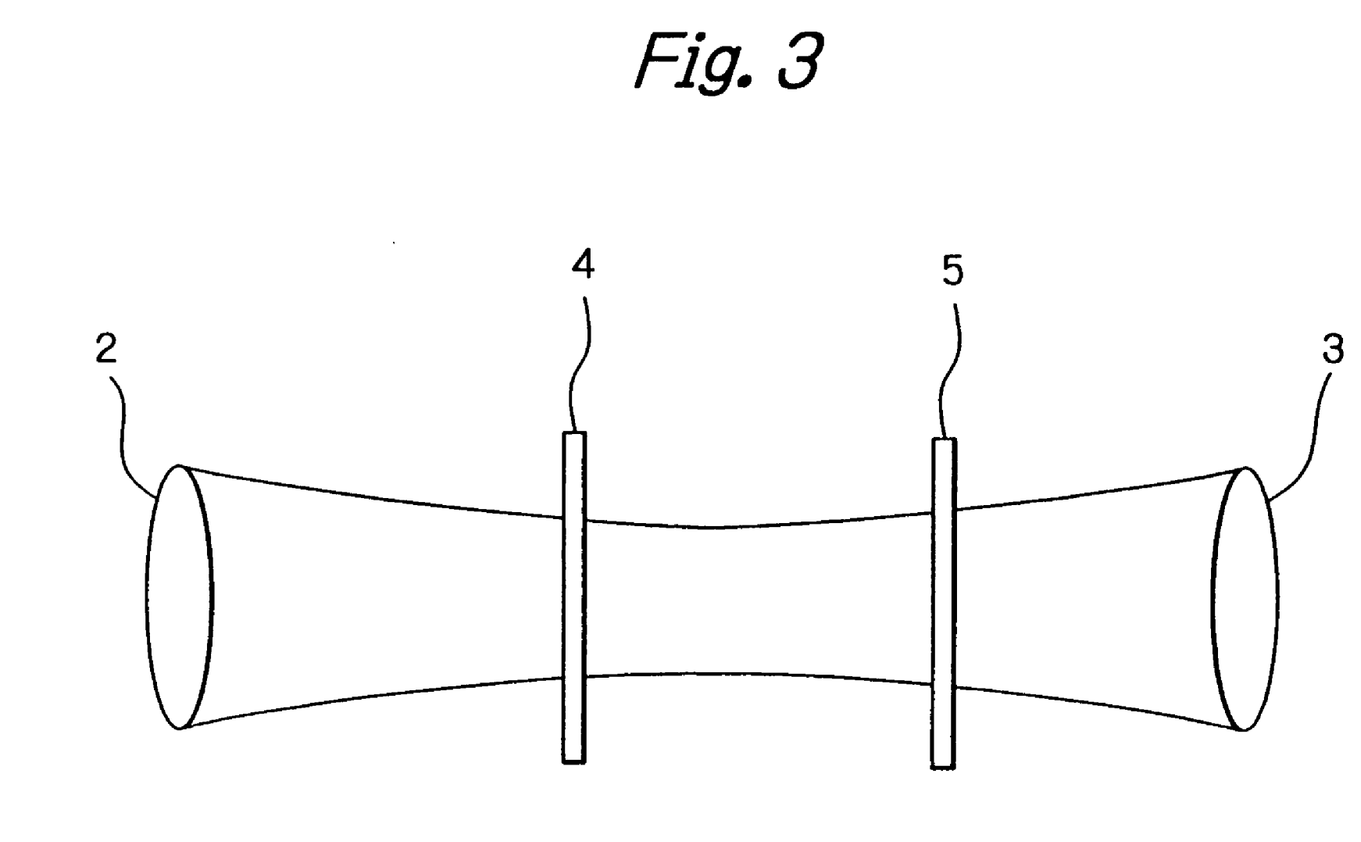
FIG. 3 is a view showing specific optical system including two optical elements and two reflectors.

FIG. 3 shows a specific optical transmission system including two optical elements and two reflectors. As shown, a beam input via an input port, not shown, is incident to an input optical element 2. The input optical element 2 condenses the incident beam onto an input reflector 4. The input reflector 4 steers the beam by reflecting it although the beam is shown as propagating straight in FIG. 3. This is also true with the beam incident to an output reflector 5. The beam steered by the input reflector 4 still maintains the characteristics given by the input optical element 2. It follows that the beam radius decreases with the propagation of the beam and becomes minimum at the beam waist position. Subsequently, the beam radius increases with an increase in the distance from the beam waist position. The beam is then incident to the output reflector 5 and again steered thereby before reaching an output optical element 3. The output optical element 3 condenses the incident beam onto an output port not shown.

Assume that the optical transmission system shown in FIG. 3 includes a plurality of pairs of input ports and input optical elements 2 and a plurality of pairs of output ports and output optical elements 3. Then, the distance between the input optical element 2 and the output optical element 3 varies in accordance with the combination of the input port and output port. When the above distance varies, the ratio of the beam radius on each of the reflectors 4 and 5 to the size of the reflector also varies.

Figure 4:
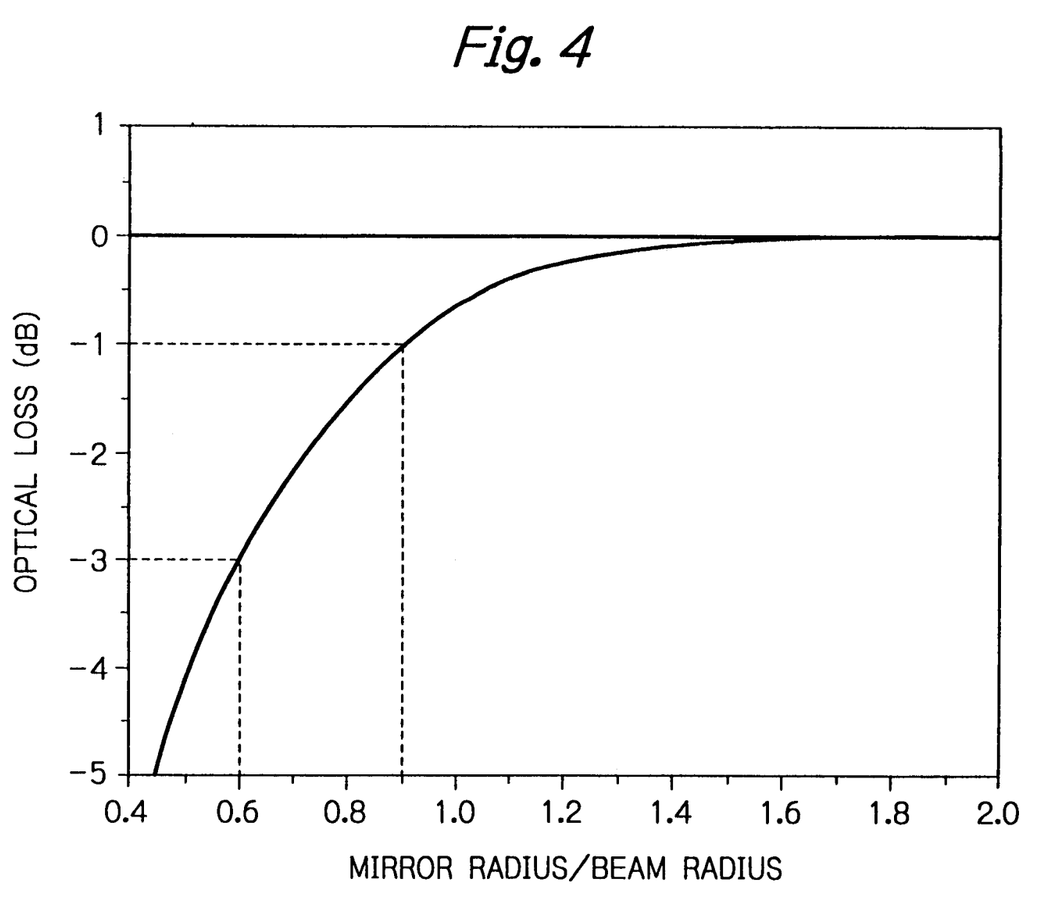
FIG. 4 is a graph showing a relation between a ratio of the radius of a circular mirror to a beam radius and an optical loss.

FIG. 4 shows a relation between the optical loss (ordinate) and the ratio of the circular mirror radius to the beam radius (abscissa). As shown, the optical loss increases with a decrease in the ratio of the mirror radius to the beam radius. Such a variation of the optical loss causes signal quality to vary from one output port to another output port, as stated earlier. Therefore, if the ratio of the size of the reflector 4 or 5 to the beam radius is confined in a certain range without regard to the variation of the distance between the two optical elements 2 and 3, then there can be achieved an optical transmission system free from the above problem.

As shown in FIG. 4, when the ratio of the mirror radius to the beam radius is 1.6 or above, the optical loss is zero, so that increasing the ratio above 1.6 is meaningless. Radiuses above 1.6 simply make the circular mirror large more than necessary and therefore make an optical switch bulky while reducing the number of input ports and that of output ports available. on the other hand, ratios to 0.9 maintain the optical loss less than 1 dB and are therefore desirable in practice. Further, ratios to 0.6 maintain the optical loss less than 3 dB and are acceptable in practice. Therefore, the ratio should preferably be 0.6 or above, more preferably 0.9 or above, but 1.6 or below.

In light of the above, a reflector closest to an input port (corresponding to the input reflector 4) and a reflector closest to an output port (corresponding to the output reflector) each are provided with the following size. Assume that the beam radius on a circular mirror (reflector) is expressed as:

$$r = W\sqrt{1 + \left(\frac{\lambda \cdot x}{\pi \cdot W^2}\right)^2} \quad \text{Eq. (2)}$$

where W is the beam waist radius, λ is the wavelength of the beam, x is greater one of the distance between the beam waist position and the reflector closest to the input port and the distance between the beam waist position and the reflector closest to the output port.

Then, the size of each reflector is selected to be the size of a circle whose radius is 0.6 times as great as the value derived from the Eq. (2) or above, preferably 0.9 times as great as the same value or above, but 1.6 times or below.

Further, when the output port is switched, the optical distance between the input optical element 2 and the output optical element 3 varies. Consequently, the output reflector 5 is shifted relative to the beam waist position with the result that the beam radius at the position of the reflector 5 varies, causing the optical loss to vary. A change in optical loss directly translates into a change in signal quality. It is therefore necessary to reduce the variation of the optical loss. This is also true when the output port is switched. In this manner, the variation of the optical loss is ascribable to the variation of the optical distance between the input port and the output port that are switched.

The influence of the variation of the optical distance can be minimized if the variation of the distance between the beam waist position and each reflector is minimized. Generally, the beam waist position is dependent on, e.g., the beam radius at a light source or the input port, not shown, the distance between the light source or the input port and the input optical element 2 or the focal distance of the optical element 2, i.e., dependent mainly on the characteristic of the optical element 2. Such a characteristic of the optical element 2 can be determined independently of the optical distance between the beam waist position and the output port. To minimize the variation of the distance between the beam waist position and each reflector, the beam waist position should only be located at the center of the width over which the optical distance between the input port and the output port varies.

Assume that the maximum optical distance and the minimum optical distance between the optical element closest to the input port and the optical element closest to the output port are DL and DS, respectively. Also, assume that the distance between the optical element closest to the input port and the center of the optical distance is P. Then, there holds a relation:

$$DS/2 \leq P \leq DL/2$$

It follows that the beam waist position Q, which is the center of the variation width, is produced by:

$$(DL+DS)/4=(DS/2+DL/2)/2$$

The distances DL and DS between the optical element closest to the input port and the optical element closest to the output port can be geometrically determined. The beam waist position can also be determined by use of general geometric optical calculation.

The beam waist position Q is acceptable even when it varies within the range of 10% of (DL+DS)/4, i.e.:

$$0.9 \times (DL+DS)/4 \leq Q \leq 1.1 \times (DS+DS)/4$$

In the case where neither the input port nor the output port is switched, DL is equal to DS, so that the beam waist position is located at the intermediate between. the input port and the output port.

Further, the beam waist position Q may be located at any position within the variation width of the optical distance between the input port and the output port for the same reason as described above, i.e.:

$$DS/2 \leq Q \leq DL/2$$

Figure 5:
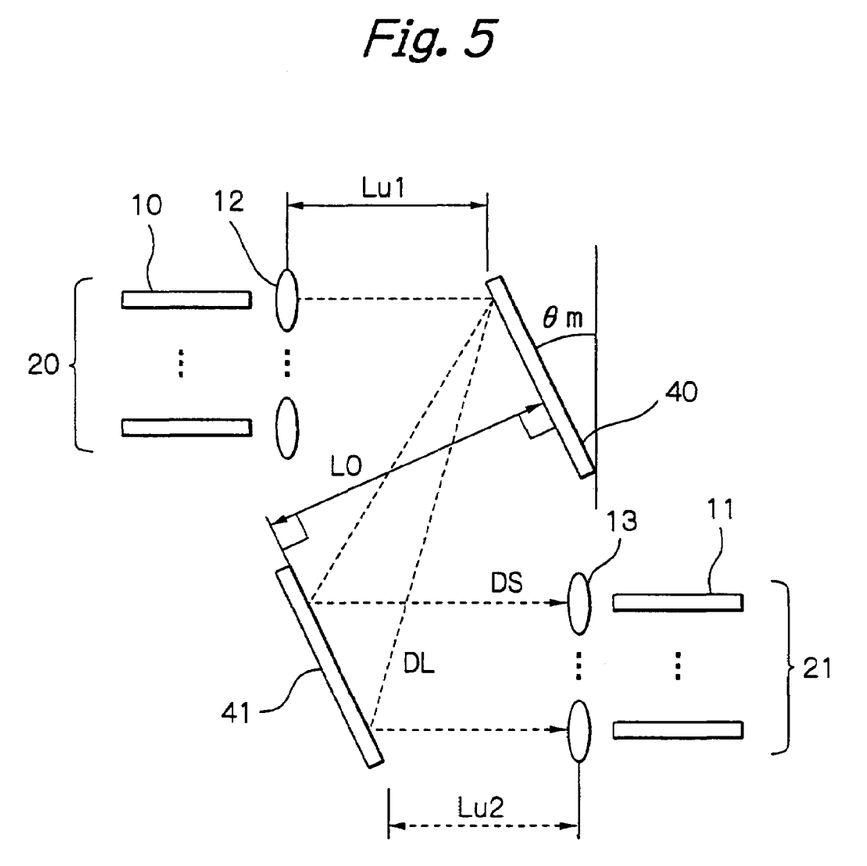
FIG. 5 is a view showing an optical transmission system embodying the present invention.

Referring to FIG. 5, an optical transmission system embodying the present invention will be described. As shown, the optical transmission system includes an input port 20, a plurality of input optical elements 12, a group of input reflectors 40, a group of output reflectors 41, a plurality of output optical elements 13, and an output port 21. The input port 20 and output port 21 include a plurality of single-mode optical fibers 10 and a plurality of single-mode optical fibers 11, respectively. More specifically, at the input port 20, 1,296 single-mode optical fibers are arranged in a 36 (vertical)×36 (horizontal) lattice configuration at a pitch of 1.0 mm. A laser beam having a wavelength of 1.55 µm is radiated toward the input optical element 12 via the individual optical fiber 10.

In the illustrative embodiment, the input optical elements 12, which are condenser lenses, each are implemented as a convex lens formed of synthetic quartz and having a focal distance of 3.50 mm. The optical elements 12 are arranged in a 36 (vertical)×36 (horizontal) lattice configuration at a pitch of 1.0 mm in the same manner as the optical fibers 10 of the input port 20. The output end of each optical fiber 10 and the corresponding optical element 12 are spaced by a distance of 3.60 mm. The laser beam output from any one of the optical fibers 10 is transmitted through preselected one of the optical element 12 toward the group of input reflectors 40.

Figure 6:
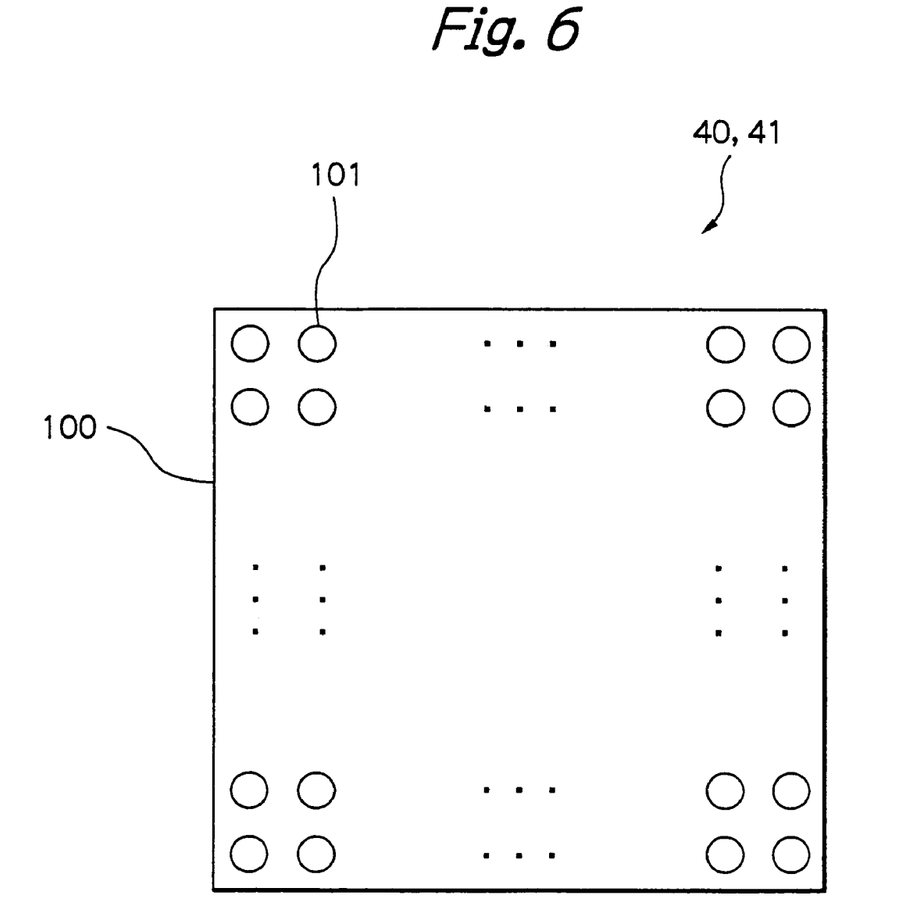
FIG. 6 shows the arrangement of input reflectors or that of output reflectors included in the illustrative embodiment.

The input reflectors constituting the group 40 are implemented as an assembly of mirrors. As shown in FIG. 6 specifically, micromirrors 101 are formed on a ceramic substrate 100 and mainly formed of silicon. The micromirrors 101 are also arranged in a 36 (vertical)×36 (horizontal) lattice configuration at a pitch of 1.00 mm vertically and a pitch of 1.10 mm horizontally. Why the horizontal pitch is greater than the vertical pitch by 0.10 mm is that the reflector group 40 is inclined by an angle θm of 25° relative to laser beams (p=1/cos(25°)=1.1). The micromirrors 101 can be inclined by the maximum angle of 10° in both of the vertical and horizontal directions. By adjusting the inclination, it is possible to select a desired direction in which the laser beam is to be reflected. Each micromirror 101 has a circular configuration having a radius of 0.3 mm. While the reflectors each are implemented as a circle in the illustrative embodiment, they may be implemented as a polygon contacting the circle, e.g., a square whose one side is 0.6 mm long.

More specifically, a controller, not shown, controls the inclination of the micromirrors 101, which are the input reflectors or the output reflectors. Preselected one of the micromirrors 101 reflects the laser beam transmitted through any one of the input optical elements 12. The laser beam reflected by the micromirror 101 is incident to preselected one of the output reflectors 41.

The input reflectors 40 are inclined by the angle θm of 25° toward the input optical elements 12, as stated earlier. The minimum distance $Lu_1$ between the input optical elements 12 and the input reflectors 40 is 31.00 mm while the vertical distance $L_0$ between the input reflectors 40 and the output reflectors 41 is 100.00 mm.

As shown in FIG. 6, the output reflectors 41 are identical in arrangement as the input reflectors 40 and inclined toward the output optical elements 13 by an angle θm of 25°. The output reflectors 41 face the input reflectors 40 in parallel to the input reflectors 40 so as to receive the laser beam output from the input reflectors 40. The laser beam reflected by any one of the input reflectors 40 is incident to preselected one of the micromirrors 101 constituting the output reflectors 41. The controller controls the inclination of the output reflectors 41, i.e., micromirrors 101 also. The laser beam reflected by the micromirror 101 is incident to preselected one of the output optical elements 31 constituting the output port 21.

The output optical elements 13 are identical in structure with the input optical elements 12. In the illustrative embodiment, the distance between the output ends of the optical fibers 11 and the output optical elements 13 is selected to be 3.60 mm. The laser beam again reflected by any one of the output reflectors 41 is incident to preselected one of the optical fibers 11 via the one of the output optical element 13. In the illustrative embodiment, the minimum distance $Lu_2$ between the output optical elements 13 and the reflectors 41 is selected to be 31.00 mm.

In operation, as shown in FIG. 5, the laser beam with the wavelength of 1.55 µm is output via any one of the optical fibers 10 of the input port 20. At this instant, the output end of each optical fiber 10 constitutes one beam waist position. The laser beam output from the optical fiber 10 is incident to the corresponding input optical element 12 while broadening itself. The input optical element 12 condenses the incident laser beam toward corresponding one of the input reflectors 40, i.e., micromirrors 101.

The controller controls the angle of the mirror surfaces of the micromirrors 101 such that the laser beam reflected by the above micromirror 101 is steered toward preselected one of the output reflectors 41. At the same time, the controller controls the angle of the mirror surfaces of the output reflectors 41, i.e., micromirrors 101 such that the laser beam output from the input reflector 40 is incident to corresponding one of the output reflectors 41, i.e., micromirrors 101. The micromirror 101 reflects the incident laser beam toward associated one of the output optical elements 13. The output optical element 13 condenses the laser beam toward preselected one of the optical fibers 11 constituting the output port 21. This completes the switching operation.

In the illustrative embodiment, the beam waist position, i.e., the distance $d_1$ between each input optical element 12 and the beam waist position is expressed as:

$$d_1 = \frac{\left(\frac{\pi \cdot W_1^2}{\lambda}\right)^2 \frac{1}{f} - d_0\left(1 - \frac{d_0}{f}\right)}{\left(\frac{\pi \cdot W_1^2}{\lambda}\right)^2 \left(\frac{1}{f}\right)^2 + \left(1 - \frac{d_0}{f}\right)^2} \quad \text{Eq. (3)}$$

where $W_1$ is the radius of the core of each optical fiber 10 at the input side, $\lambda$ is the wavelength of the laser beam, $d_0$ is the distance between the output end of each optical fiber 10 and the corresponding input optical element 12, and f is the focal distance of the input optical element 12.

In the illustrative embodiment, a beam waist radius $W_2$ at the beam waist position $d_1$ is produced by:

$$W_2 = W_1 \sqrt{\frac{1}{\left(\frac{\pi \cdot W_1^2}{\lambda}\right)^2 \left(\frac{1}{f}\right)^2 + \left(1 - \frac{d_0}{f}\right)^2}} \quad \text{Eq. (4)}$$

The distance between the output ends of the optical fibers 10 and the input optical elements 12 is 3.60 mm, each input optical element 12 has a focal distance of 3.5 mm, the wavelength is 1.55 μm, and the core radius of each optical fiber 10 is 5 μm, as stated earlier. Therefore, the beam waist position $d_1$ is 100.97 mm as produced by the Eq. (3). On the other hand, in the illustrative embodiment, the minimum optical distance DS and the maximum optical distance DL are 192.91 mm and 205.35 mm, respectively, so that (DL+DS)/4 is 99.6 mm. The beam waist position $d_1$ is therefore 0.9 (DL+DS)/4 or above, but 1.1(DL+DS)/4 or below, which is the prerequisite. In addition, the beam waist position $d_1$ is DS/2 or above, but DS/2 or below. It follows that the input reflectors (micromirrors) and output reflectors can both be reduced in size in good balance. This allows the input reflectors and output reflectors and therefore the entire optical transmission system to be reduced in size.

The distance between the beam waist position and the input reflector 40 closest to the input side, i.e., $(d_1-Lu_1)$ is 69.97 mm. Also, the distance between the beam waist position and the output reflector 40 closest to the output side, i.e., $(DL-Lu_2-d_1)$ is 73.38 mm. The distances from the beam waist position do not exceed such distances. That is, such a distance is the maximum distance between the input reflectors 40 and the output reflectors 41.

In light of the above, first the beam waste radius $W_2$ at the beam waist position is determined in accordance with the Eq. (4). The beam waste radius $W_2$ is then substituted for $W_0$ of the Eq. (1) ($W_0=W_2$), and 69.97 mm is substituted for x. As a result, the maximum beam radius on the input reflectors 40 is determined to be 0.280 mm. Likewise, in the Eq. (1), $W_2$ is substituted for $W_0$ while 73.38 mm is substituted for x, producing the maximum beam radius of 0.271 mm on the output reflectors 40.

Because each micromirror 101 has a circular configuration with a radius of 0.3 mm, it is 0.9 times (0.252 mm) as great as the maximum beam radius (0.271 mm) of the output reflectors 40 or above, but 1.6 times (0.448 mm) or below, which is the prerequisite. This implements an optical loss of less than 1 dB throughout the input reflectors and output reflectors (micromirrors), thereby insuring the same high signal quality over the entire output port.

It was experimentally found that when switching operation was effected under the above conditions, the maximum and minimum optical power losses between the input and the output were 5.2 dB and 4.42 dB, respectively. The optical power loss is therefore 6 dB or below, as expected, and fully acceptable in practice. Further, the difference between the maximum optical power loss and the minimum optical power loss was as small as 0.78 dB smaller than 1 dB. Such a difference means that signal quality is little susceptible to the switching operation and therefore desirable.

In the illustrative embodiments, even if the optical distances between the input ports and the corresponding output ports are not the same, uniform optical transmission is achievable without regard to the input port or the output port if an optimal beam waist position is set. Moreover, even if the beam waste radius of the laser beam is not optimized between different input ports and output ports or even if a special element is positioned at the beam waste position, uniform optical transmission is attainable without regard to the input port or the output port.

In summary, it will be seen that the present invention provides an optical transmission system capable of preventing signal quality from differing in dependence on the output port and therefore insuring uniform, high signal quality.

Various modifications will become possible for those skilled in the art after receiving the teachings of the present disclosure without departing from the scope thereof.

What is claimed is:

1. An optical transmission system comprising:
   a plurality of input ports to which a plurality of laser beams are respectively input;
   a plurality of input optical elements corresponding one-to-one to said plurality of input ports each for condensing a particular laser beam;
   a plurality of input reflectors corresponding one-to-one to said plurality of input optical elements each for reflecting a particular laser beam condensed;
   a plurality of output reflectors each for further reflecting a particular laser beam;
   a plurality of output optical elements corresponding one-to-one to said plurality of output reflectors each for further condensing the laser beam reflected; and
   a plurality of output parts corresponding one-to-one to said plurality of output optical elements each for receiving the laser beam condensed;
   wherein assuming that a maximum optical distance and a minimum optical distance between the input optical element closest to the input port and the output optical element closest to the output port are DL and DS, respectively, a beam radius of the laser beam at an output end of said input port, a wavelength of said laser beam, a distance between said output end and said input optical element and a focal distance of said input optical element are selected such that a beam waist position Q of said laser beam input from said input optical element closet to said input port satisfies a relation:

$0.9(DL+DS)/4 \leq Q \leq 1.1(DL+DS)/4$ wherein the input reflector closest to the input port has a circular configuration having a circular configuration whose radius R has a following relation or a configuration containing said circular configuration:

$0.6r \leq R$, and there holds a relation:

$$r = W\sqrt{1+\left(\frac{\lambda \cdot x}{\pi \cdot W^2}\right)^2}$$

where W is a beam waist radius of the laser beam, λ is a wavelength of said laser beam, x is a longer one of a distance between the beam waist position of said laser beam and said reflector closest to said input port and a distance between said beam waist position and said reflector closest to said output port, and π is a ratio of a circumference of a circle to a diameter.

2. The system as claimed in claim 1, wherein said reflector closest to said output port has a circular configuration having a following radius or a configuration containing said circular configuration:

0.6r≦S.

3. The system as claimed in claim 1, wherein the plurality of laser beams are input by a plurality of single-mode optical fibers.

4. The system as claimed in claim 1, wherein the input optical elements are condenser lenses.

5. The system as claimed in claim 1, wherein the input reflectors are micromirrors formed on a ceramic substrate.

6. The system as claimed in claim 5, wherein the micromirrors as arranged in a lattice configuration.

7. An optical transmission system comprising:
a plurality of ports to which plurality of laser beams are respectively input;
a plurality of input elements corresponding one-to-one said plurality of ports each for condensing a particular laser beam;
a plurality of input reflectors corresponding one-to-one to said plurality of input optical elements each for reflecting a particular laser beam condensed;
a plurality of output reflectors each for further reflecting the laser beam;
a plurality of output optical elements corresponding one-to-one to said plurality of output reflectors each for further condensing the laser beam reflected; and
a plurality of output ports corresponding one-to-one to said plurality of output optical elements each for receiving the laser beaming condensed;
wherein assuming that a maximum optical distance and a minimum optical distance between the input optical element closest to the input port and the output optical element closest to the output port are DL and SL, respectively, a beam radius of the laser beam at an output end of said input port, a wavelength of said laser beam, a distance between said output end and said input optical element and a focal distance of said input optical element are selected such that a beam waist position Q of said laser beam output from said input optical element closest to said input port satisfies a relation:

DS/2≦Q≦DL/2 wherein the input reflector closest to the input port has a circular configuration having a circular configuration whose radius R has a following relation or a configuration containing said circular configuration:

0.6r≦R, and there holds a relation;

$$r = W\sqrt{1+\left(\frac{\lambda \cdot x}{\pi \cdot W^2}\right)^2}$$

where W is abeam waist radius of the laser beam, λ is a wavelength of said laser beam, x is a longer one of a distance between the beam waist position of said laser beam and said reflector closest to said input port and a distance between said beam waist position and said reflector closest to said output port, and π is a ratio of a circumference of a circle to a diameter.

8. The system as claimed in claim 7, wherein said reflector closest to said output port has a circular configuration having a following radius or a configuration containing said circular configuration:

0.6r≦S.

9. The system as claimed in claim 7, wherein the plurality of laser beams are input by a plurality of single-mode optical fibers.

10. The system as claimed in claim 7, wherein the input optical elements are condenser lenses.

11. The system as claimed in claim 7, wherein the input reflectors are micromirrors formed on a ceramic substrate.

12. The system as claimed in claim 11, wherein the micromirrors as arranged in a lattice configuration.

* * * * *